United States Patent [19]
Bodin et al.

[11] Patent Number: 5,675,762
[45] Date of Patent: Oct. 7, 1997

[54] SYSTEM FOR LOCKING DOWN PART OF PORTION OF MEMORY AND UPDATING PAGE DIRECTORY WITH ENTRY CORRESPONDING TO PART OF PORTION OF THE MEMORY LOCKED DOWN

[75] Inventors: William Kress Bodin; David Michael Hyde; Tatchi Placido Lay, all of Boca Raton, Fla.; James Wilkinson, Southampton, United Kingdom; Susan Yee, Coral Springs, Fla.

[73] Assignee: International Business Machines Corporation, Armonk, N.Y.

[21] Appl. No.: 369,330

[22] Filed: Jan. 6, 1995

Related U.S. Application Data

[63] Continuation of Ser. No. 252,988, Jun. 1, 1994, abandoned, which is a continuation of Ser. No. 862,913, Apr. 3, 1992, abandoned.

[51] Int. Cl.⁶ .................................................. G06F 12/10
[52] U.S. Cl. .................................................. 395/416
[58] Field of Search .......................... 395/406, 417, 395/415, 412, 418, 416, 413, 800, 480, 823

[56] References Cited

U.S. PATENT DOCUMENTS

| | | | |
|---|---|---|---|
| 4,173,783 | 11/1979 | Conleur et al. | 395/823 |
| 4,373,179 | 2/1983 | Katsumata | 395/417 |
| 4,787,026 | 11/1988 | Barnes et al. | 395/800 |
| 4,843,542 | 6/1989 | Dashiell et al. | 395/446 |
| 4,926,322 | 5/1990 | Stimac et al. | 395/500 |
| 4,937,736 | 6/1990 | Chang et al. | 395/418 |
| 4,939,507 | 7/1990 | Beard et al. | 345/156 |
| 4,974,157 | 11/1990 | Hargrove et al. | 395/527 |
| 5,101,485 | 3/1992 | Perazzoli, Jr. | 395/416 |
| 5,113,180 | 5/1992 | Gupta et al. | 345/190 |
| 5,119,494 | 6/1992 | Garman | 395/412 |
| 5,220,657 | 6/1993 | Bly et al. | 395/479 |
| 5,226,143 | 7/1993 | Baird et al. | 395/472 |
| 5,276,848 | 1/1994 | Gallagher et al. | 395/448 |
| 5,319,760 | 6/1994 | Mason et al. | 395/418 |
| 5,321,836 | 6/1994 | Crawford et al. | 395/416 |
| 5,339,397 | 8/1994 | Eikill et al. | 395/416 |
| 5,369,744 | 11/1994 | Fukushima et al. | 395/501 |
| 5,507,026 | 4/1996 | Fukushima et al. | 395/501 |

*Primary Examiner*—Moustafa M. Meky
*Attorney, Agent, or Firm*—Mark S. Walker; Duke W. Yee; Andrew J. Dillon

[57] ABSTRACT

A method and apparatus are disclosed for providing exchange of data between a peripheral device having a paging mechanism and an application operating in a virtual machine which includes a page directory for exclusive use by the paging mechanism of the peripheral device. The virtual machine is running on a data processing system and preferably contains a block of memory which is divided into various sections of memory. The page directory is provided to the paging mechanism of the peripheral device when the application requires the use of the peripheral device. A section of memory is selectively locked down in response to the section of memory being utilized by the application. Additionally, the page directory is updated with an entry which identifies the section of memory that is locked down. Memory may also be locked down in order to permit the peripheral device to access that section of memory. The page directory is selectively updated thereafter by mapping entries into the page directory in order to track memory usage within the block of memory utilized by the virtual machine. The page directory is preferably created at the same time the virtual machine is created. Memory for utilization by the virtual machine is preferably locked down while the virtual machine is in the foreground. When the virtual machine is terminated or moved into the background, the sections of memory that have been locked down are then unlocked or freed for other use.

18 Claims, 14 Drawing Sheets

SYSTEM FOR LOCKING DOWN PART OF PORTION OF MEMORY AND UPDATING PAGE DIRECTORY WITH ENTRY CORRESPONDING TO PART OF PORTION OF THE MEMORY LOCKED DOWN

This ia a continuation, of application Ser. No. 08/252,988 filed Jun. 1, 1994, now abandoned, which is a continuation, of application Ser. No. 07/862,913, filed Apr. 3, 1992, now adandoned

BACKGROUND OF THE INVENTION

1. Technical Field

The present invention relates in general to an improved method and apparatus for transferring data, and in particular to an improved method and apparatus for transferring data between an application running on a data processing system and an adapter connected to the data processing system. Still more particularly, the present invention relates to an improved method and apparatus for transferring data between an application running in virtual mode in a data processing system and an adapter having a microprocessor capable of memory access.

2. Description of the Related Art

In modern data processing systems, more advanced graphics adapters for controlling video displays have been introduced in which a microprocessor has been placed on the graphics adapter to control the display on a video terminal. For example, the Extended Graphics Adapter ("XGA adapter") is a high resolution adapter with Micro-Channel direct memory access ("DMA") busmaster capability. Both the XGA and the Micro Channel are products of International Business Machines Corporation. XGA is a trademark of International Business Machines Corporation and Micro Channel is a registered trademark of International Business Machines Corporation.

Busmaster capability is the capability of an adapter or peripheral device to process tasks and access memory anywhere in the system address space independently of the host microprocessor. In addition, this capability includes addressing of memory located on the adapter. Busmaster capability is provided through a microprocessor within the XGA adapter. However, the microprocessor in such an adapter is typically less powerful than the host microprocessor in the data processing system.

An XGA Virtual Device Driver ("VDD") is a component of the operating system whose purpose is to grant input/output ("I/O") privileges, save/restore the video states, and provide a video bit map for XGA applications executing in Virtual DOS Machines ("VDM"). Two of the principle functions of the XGA VDD are saving the contents of the video random access memory ("VRAM") when a foreground XGA VDM session switches to background and restoring the VRAM data when a background VGA VDM session switches to the foreground.

Presently, the DMA hardware in an XGA adapter results in the expectation of operations on physical memory occurring at a fixed location. This hardware system may cause problems in applications operating in virtual mode in virtual memory. Virtual mode is a mode in which a program may be paged. For example, a typical XGA DOS application, including the adapter interface, does inline virtual or linear to physical address conversion by simply "shift left by 4 and add" to produce the source and/or destination parameters for the XGA microprocessor. With the introduction of multiple virtual DOS machines in newer operating systems, such as OS/2, Virtual DOS Machines ("VDM") will no longer occupy the bottom 640K of physical memory, making usage of the XGA adapter hardware a risk to the stability of the data processing system in this environment. OS/2 is also a name of a product and a registered trademark of International Business Machines Corporation.

It would therefore be desirable to have a method and apparatus to support applications running in virtual mode, utilizing adapters having busmaster capabilities.

SUMMARY OF THE INVENTION

It is therefore one object of the present invention to provide an improved method and apparatus for transferring data.

It is another object of the present invention to provide an improved method and apparatus for transferring data between an application running on a data processing system and an adapter connected to the data processing system.

It is yet another object of the present invention to provide a method and apparatus for transferring data between an application running in virtual mode in a data processing system and an adapter having a microprocessor capable of memory access.

The foregoing objects are achieved as is now described. A method and apparatus are disclosed for providing exchange of data between a peripheral device having a paging mechanism and an application operating in a virtual machine which includes a page directory for exclusive use by the paging mechanism of the peripheral device. The virtual machine is running on a data processing system and preferably contains a block of memory which is divided into various sections of memory. The page directory is provided to the paging mechanism of the peripheral device when the application requires the use of the peripheral device. A section of memory is selectively locked down in response to the section of memory being utilized by the application. Additionally, the page directory is updated with an entry which identifies the section of memory that is locked down. Memory may also be locked down in order to permit the peripheral device to access that section of memory. The page directory is selectively updated thereafter by mapping entries into the page directory in order to track memory usage within the block of memory utilized by the virtual machine.

The page directory is preferably created at the same time the virtual machine is created. Memory for utilization by the virtual machine is preferably locked down while the virtual machine is in the foreground. When the virtual machine is terminated or moved into the background, the sections of memory that have been locked down are then unlocked or freed for other use.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
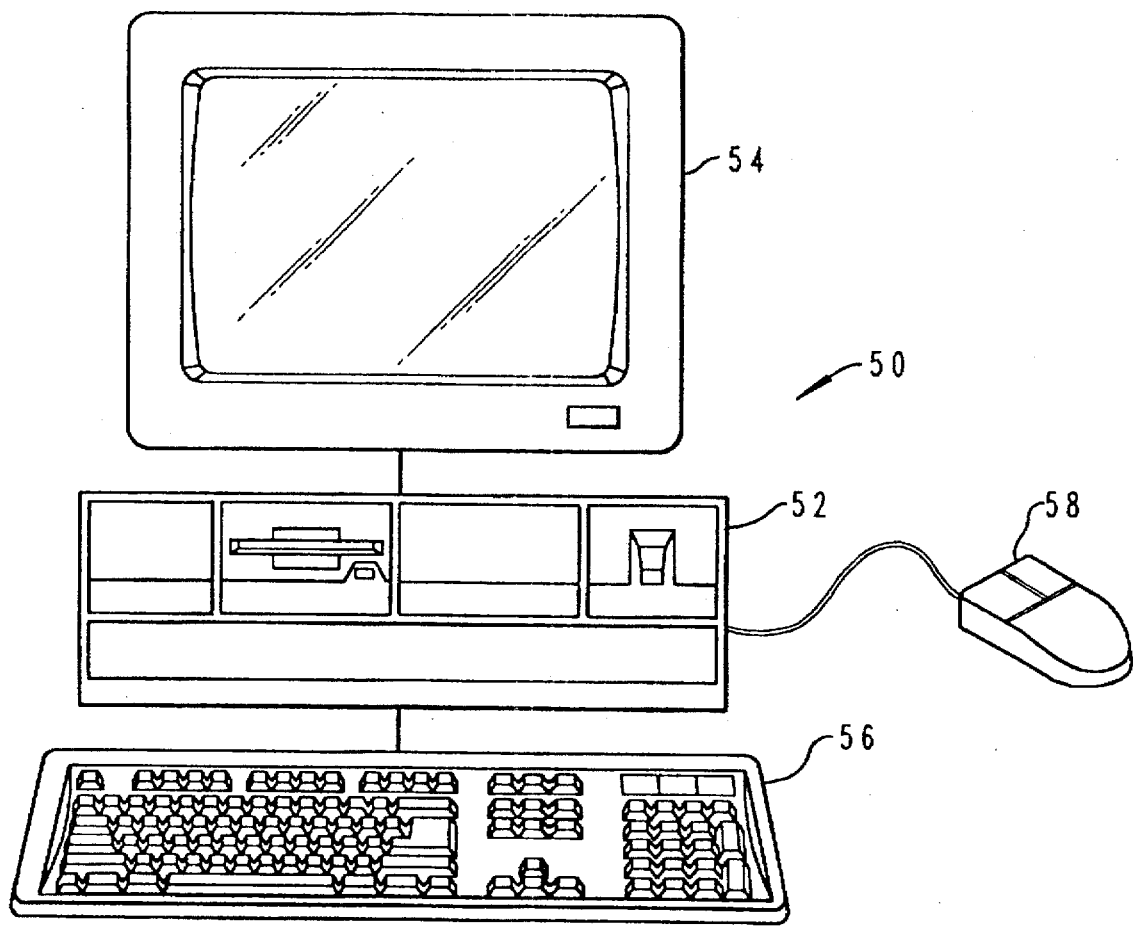
FIG. 1 depicts a pictorial representation of a data processing system in which a preferred embodiment of the present invention may be implemented.

With reference now to the figures and in particular with reference to FIG. 1, there is depicted a pictorial representation of a data processing system in which a preferred embodiment in accordance with the present invention may be implemented. A personal computer 50 is depicted which includes a system unit 52, a video display terminal 54, a keyboard 56, and a mouse 58. Personal computer 50 may be implemented utilizing any suitable computer such as the IBM PS/2 computer, a product of International Business Machines Corporation.

Figure 2:
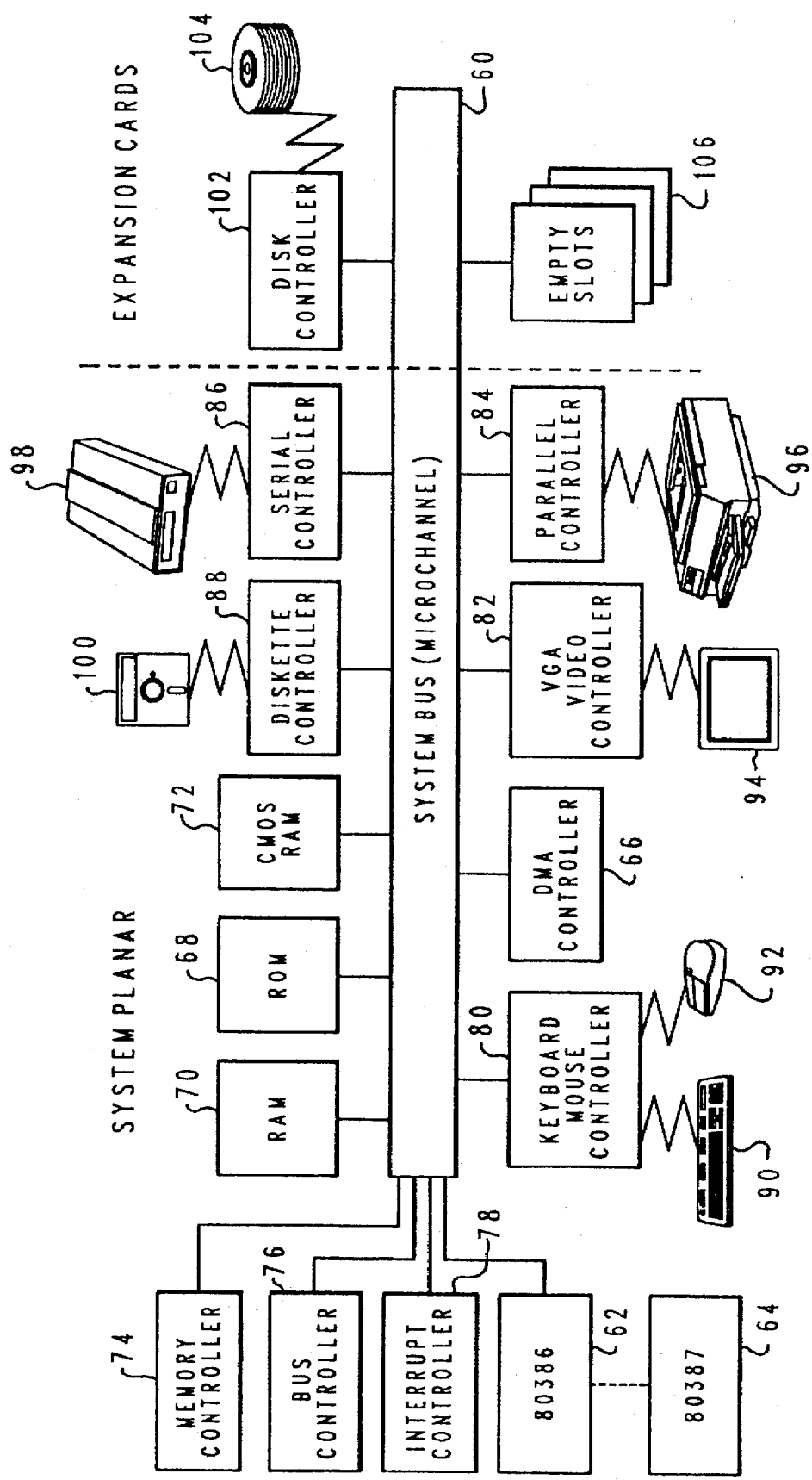
FIG. 2 is a block diagram of selected components in a data processing system.

Referring now to FIG. 2, there is depicted a block diagram of selected components in personal computer 50 in which a preferred embodiment of the present invention may be implemented. System unit 52 preferably includes a system bus 60 for inter connecting and establishing communication between various components in system unit 52. Microprocessor 62 is connected to system bus 60 and may also have numeric coprocessor 64 connected to it. DMA controller 66 is also connected to system bus 60 and allows various devices to appropriate cycles from microprocessor 62 during large I/O transfers.

Read only memory ("ROM") 68 is mapped into the microprocessor 62 address space in the range from 640K to 1 megabyte. Read Only Memory ("ROM") 68 and Random Access Memory ("RAM") 70 are also connected to system bus 60. ROM 68 contains the power-on serf test ("POST") and the Basic Input/Output System ("BIOS") which control hardware operations, such as those involving disk drives and the keyboard. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output ("I/O") controllers such as: keyboard and mouse controller 80, video controller 82, parallel controller 84, serial controller 86, and diskette controller 88. Keyboard and mouse controller 80 provides a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards may also be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like may also be utilized in addition to or in place of the hardware already depicted.

Figure 3:
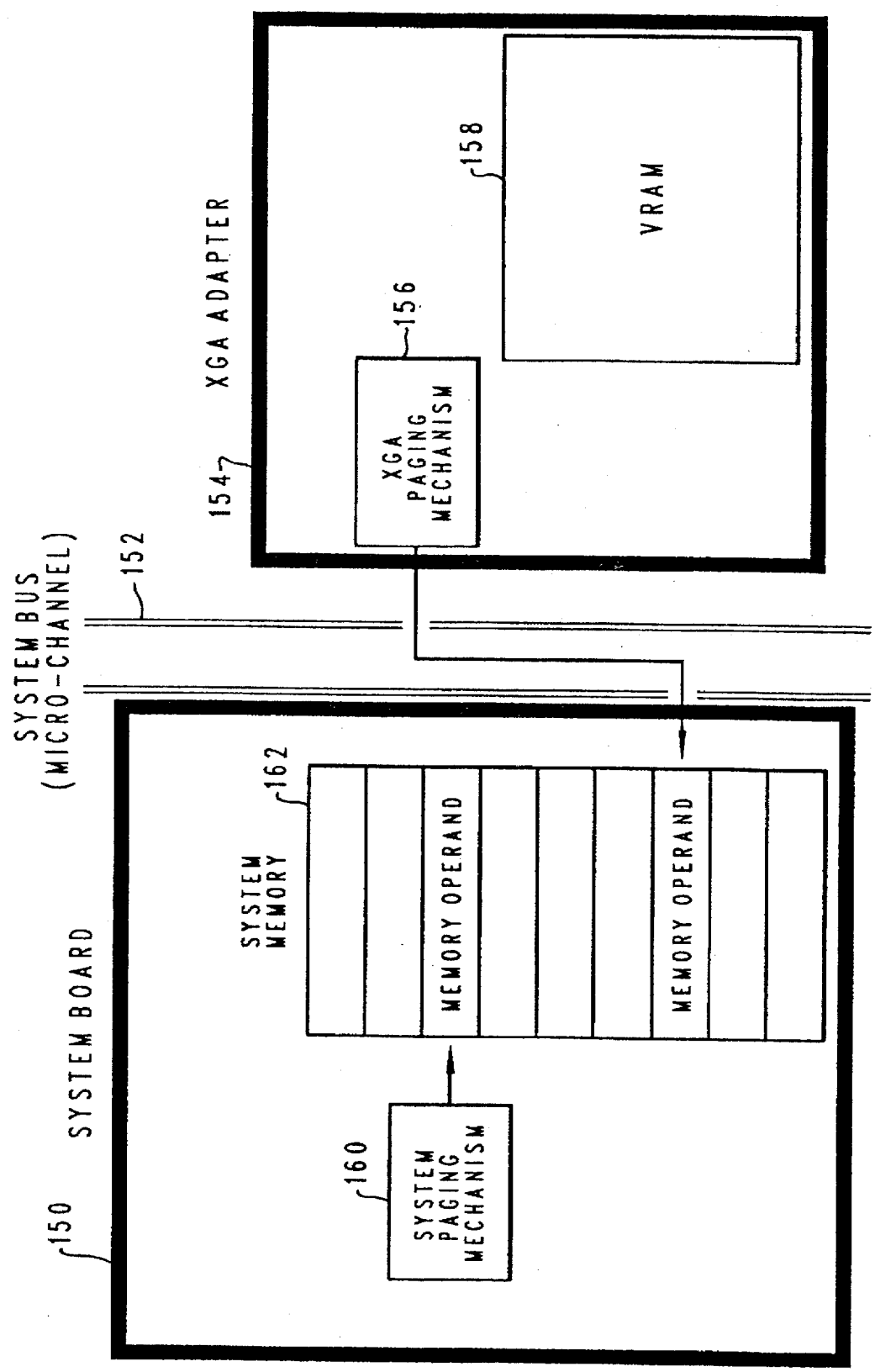
FIG. 3 depicts a microcomputer block diagram configuration of a system board and XGA adapter which may be utilized in a preferred embodiment of the present invention.

Next, with reference to FIG. 3, there is depicted a microcomputer block diagram of a system board and XGA adapter which may be utilized in a preferred embodiment of the present invention. System board 150 is connected to system bus 152. XGA adapter 154 is also connected to system bus 152, making communications between system board 150 and XGA adapter 154 possible. XGA adapter 154 preferably contains XGA paging mechanism 156 and VRAM 158. XGA paging mechanism 156 is utilized to track memory usage by applications utilizing XGA adapter 154 for video display. VRAM 158 is utilized to store video data that is displayed on a video display terminal. System board 150 contains system paging mechanism 160 and system memory 162. System paging mechanism 160 is utilized to keep track of various activities in system memory 162.

"Paging" is a type of memory management useful for virtual memory multi-tasking operating systems. Paging divides programs into multiple uniform size pages, which bear no direct relation to the logical structure of a program. For example, in the Intel 80486 microprocessor two levels of tables are utilized to translate a linear address into a physical address. Three components exist in the paging mechanism of the Intel 80486 microprocessor: the page directory, the page tables, and the page itself (pageframe). The Intel 80486 microprocessor is a product of the Intel Corporation. A page directory in the Intel 80486 microprocessor is 4K bytes long and allows up to 1024 page directory entries. Each page directory entry contains the address of the next level of tables, the page tables and information about the page table. Each page table is also 4K bytes long and holds up to 1024 page table entries. Page table entries contain the starting address of the page frame and statistical information about the page. As those skilled in the art will appreciate page tables may be shared between tasks and swapped to disks.

A page directory is provided for the mapping of memory for various XGA adapters that may be present on a data processing system. All the XGA adapters connected to a data processing system will access the same page directory. A page table within the page directory may be utilized to map memory usage in a particular VDM. Entries within a particular page table contain the information mapping the 640K memory area and any extended memory that a VDM may utilize.

A map table is preferably located in the page table. The map table represents the memory utilized by a VDM. The map table generally includes a field called "handle". The handle field indicates whether a particular memory address is locked down. Another field found in the map table is the address field, which indicates what memory addresses have been mapped.

Figure 4:
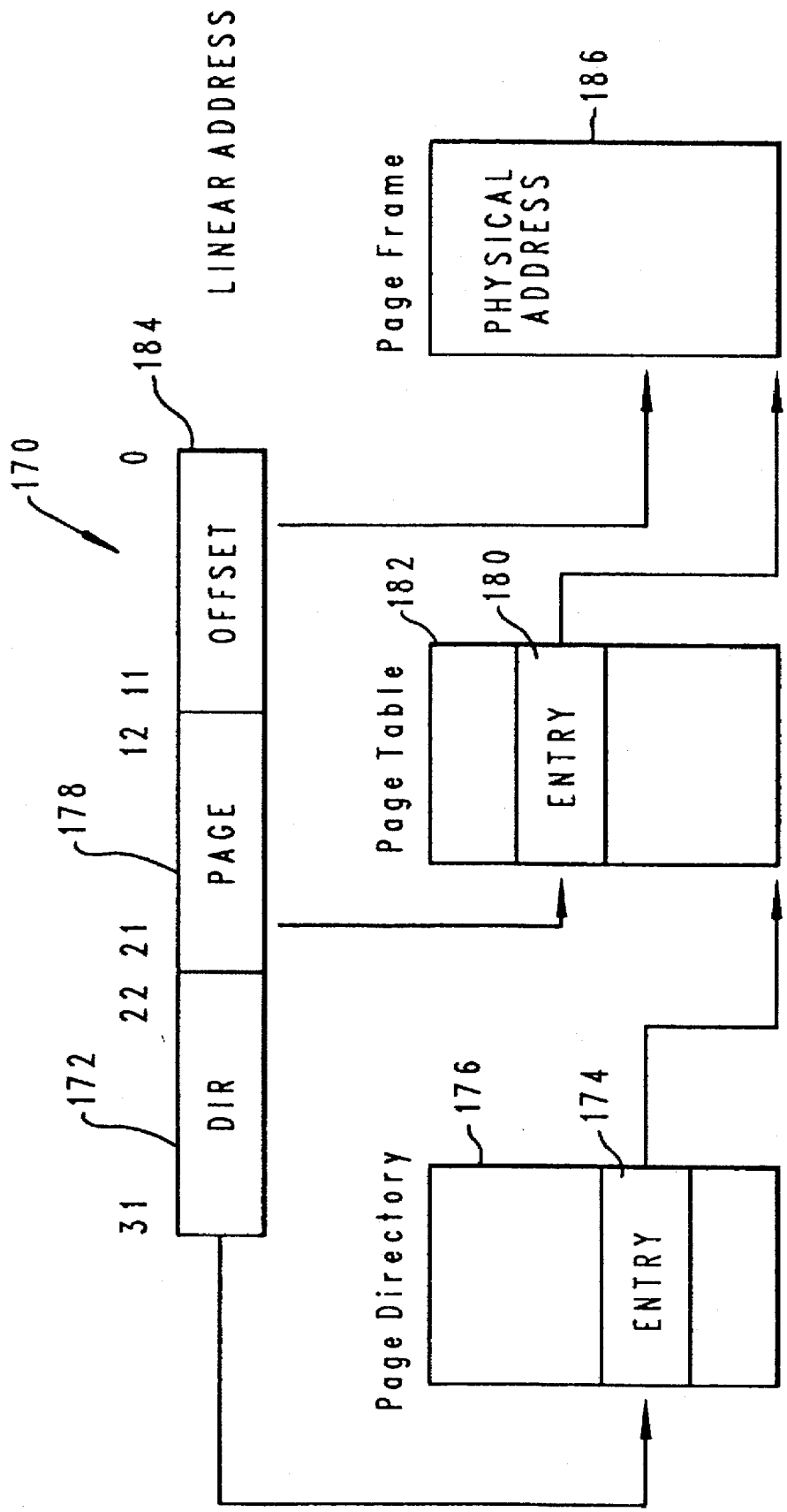
FIG. 4 is a block diagram of a paging mechanism for translating a linear address to a physical address which may be utilized in accordance with the method and system of the present invention.

Referring now to FIG. 4, there is depicted a block diagram of a paging mechanism which may be utilized for translating a linear address to a physical address. Linear address 170 contains directory bits 172, which are represented by the upper 10 bits of the linear address, bits 22–31. Directory bits 172 are utilized as an index to select entry 174 in page directory 176. Page bits 178 make up the bits from 12 to 21 within linear address 170. These address bits are utilized as an index to select entry 180 in page table 182. Offset bits 184 preferably include bits 0–12 in linear address 170. Entry 174 and entry 180 are concatenated with offset bits 184 to form a physical address in page frame 186.

Presently, it is not possible to lock the entire VDM contiguously in the bottom 640K of the physical address space of memory. The XGA DOS application will continue to use the "shift left 4 and add" method to generate inline virtual to physical addresses.

Given the fact that a virtual DOS machine operates in a 4 megabyte linear address boundary under newer operating systems, such as OS/2, it is only logical to take advantage of the XGA hardware's virtual memory mode feature provided by an onboard virtual memory translation logic chip which is functionally equivalent to the Intel 80486 paging unit in the Intel 80486 microprocessor. More information on the Intel 80486 microprocessor may be found in the 80486 programmer's reference manual available from Intel Corporation. Under virtual memory mode, the XGA adapter is capable of forming a physical address for a given memory object by translating a page directory and page table information. To ensure that memory objects may be safely utilized by the XGA microprocessor, the page directory and page table information must always be physically present and readily available for exclusive usage, in a manner generally referred to as being "locked down".

In accordance with the present invention, when the first XGA VDM is started, a page directory is obtained for exclusive use by the XGA microprocessor. This page directory is separate from that utilized by the operating system and is necessary because the XGA microprocessor cannot handle dynamic changes to the page directory, as in the case of task switching where the first 128 entries in the page directory are swapped by the task management component of the operating system.

Once the virtual device driver detects usage of the XGA by the DOS application, the 640K virtual DOS machine linear address space along with any extended memory ("XMS"), expanded memory ("EMS"), or protected memory ("DPMI") utilized by the application will be locked down to ensure accessibility by the XGA microprocessor. An entry corresponding to the appropriate linear address is then recorded in the XGA's page directory. These steps provide a reasonable level of protection against corrupting the system inadvertently by XGA DOS applications.

As other VDDs may also access memory within the 640K DOS region, the XGA VDD must be kept aware of this by mapping any such access and managing the table containing the list of regions as they are accessed by other VDDs. When the other VDDs have completed their initialization, the XGA VDD will then include those regions missing from the 640K address space to its list, thereby encompassing the entire 640K DOS address space region.

A DOS application may utilize XMS, EMS, and DPMI services to dynamically access memory objects beyond the 1 megabyte+64K region, and these memory objects may be utilized as source and/or destination parameters for the XGA microprocessor. Therefore a detection mechanism is utilized to ensure that these memory objects are locked down while the virtual DOS machine is running in the foreground. All accesses to memory objects beyond the 1 megabyte+64K region are also saved in a table containing each address and the length of the object. A memory object may include code for a program or TSR, or data. A page table entry is preferably made in the XGA's microprocessor page directory and page tables whenever XMS, EMS, or DPMI map notifications occur.

When a DOS application is operating in the foreground, all objects in this table are locked down after verifying that this is a DOS XGA application accessing the XGA hardware. Foreground is the environment in which high-priority programs are executed. In foreground, the program or application is normally displayed on the video display terminal. These steps guarantee that memory is present for any operation by the XGA microprocessor, which searches its own page directory and page table for the appropriate memory locations. The microprocessor within the system requires the physical memory to be available for successful I/O transfers. Therefore, the risk of having the memories being swappable and not present should be avoided.

Locked down memory is restored for system use when the DOS application is switched to background and no longer running in the foreground by unlocking and freeing all such memory and making that memory available for re-use. In background, a program has a lower priority, as compared to a program in foreground. In a full screen application, a program in background has its graphics display data stored in a storage device, such as memory or on a disk, until the application is switched back into the foreground. The VDD, however, must still be aware of any accesses to extended memory to record any newly mapped-in pages and release any previously mapped-in pages. On subsequent switches to foreground, the virtual DOS machine will always be locked down until the virtual DOS machine exits XGA mode.

In accordance with a preferred embodiment of the present invention, a unique implementation is provided for ensuring that a DOS application written to execute on busmaster hardware will continue to be supported when running in virtual mode on a 80386 or 80486. Locking down the comparable 640K DOS region represented in the virtual DOS machine and building the appropriate page directory and page tables associated with this memory will ensure successful busmaster I/O transfer by the XGA microprocessor and all other adapters with busmaster capabilities.

Although this particular embodiment of the present invention details the concept for virtualizing the DOS environment to support adapters with busmaster capabilities, it is envisioned that alternate embodiments in accordance with present invention will include any other operating system that may be virtualized.

A virtual device driver, as those skilled in the art will appreciate, is an installable module responsible for virtualizing a particular piece of hardware and associated ROM BIOS in the manner expected by a DOS application. A device driver achieves virmalization by emulating I/O port and device memory operations. The virtual device driver usually communicates with a physical device driver in order to interact with hardware. Physical device drivers support standard I/O devices in most operating systems. Additional or replacement physical device drivers may be loaded to support nonstandard I/O devices. For example, ANSI.SYS and EGA.SYS, which are loaded by DEVICE equal statements in CONFIG.SYS, are loadable device drivers and provide additional functions on the interfaces to the screen and keyboard. Further information on physical device drivers, physical device driver interfaces, and system services available on these driven may be found in the OS/2 2.0 Physical Device Driver Reference available from International Business Machines Corporation.

A virtual device driver ("VDD") manages I/O ports, device memory, and ROM BIOS services for the devices it virtualizes. VDDs are designed to behave as much as possible like the emulated physical hardware. A physical device driver and a virtual device driver may be differentiated in that a physical device driver is considered a "true" device driver in the sense that it has a unique and rigid file structure, and interfaces directly with the hardware. On the other hand, a virtual device driver is essentially a dynamic link library, and generally does not interface directly with the hardware. Instead, a virtual device driver is responsible for presenting a virtual copy of a hardware resource to a DOS session, and for coordinating physical access to that resource.

Figure 5:
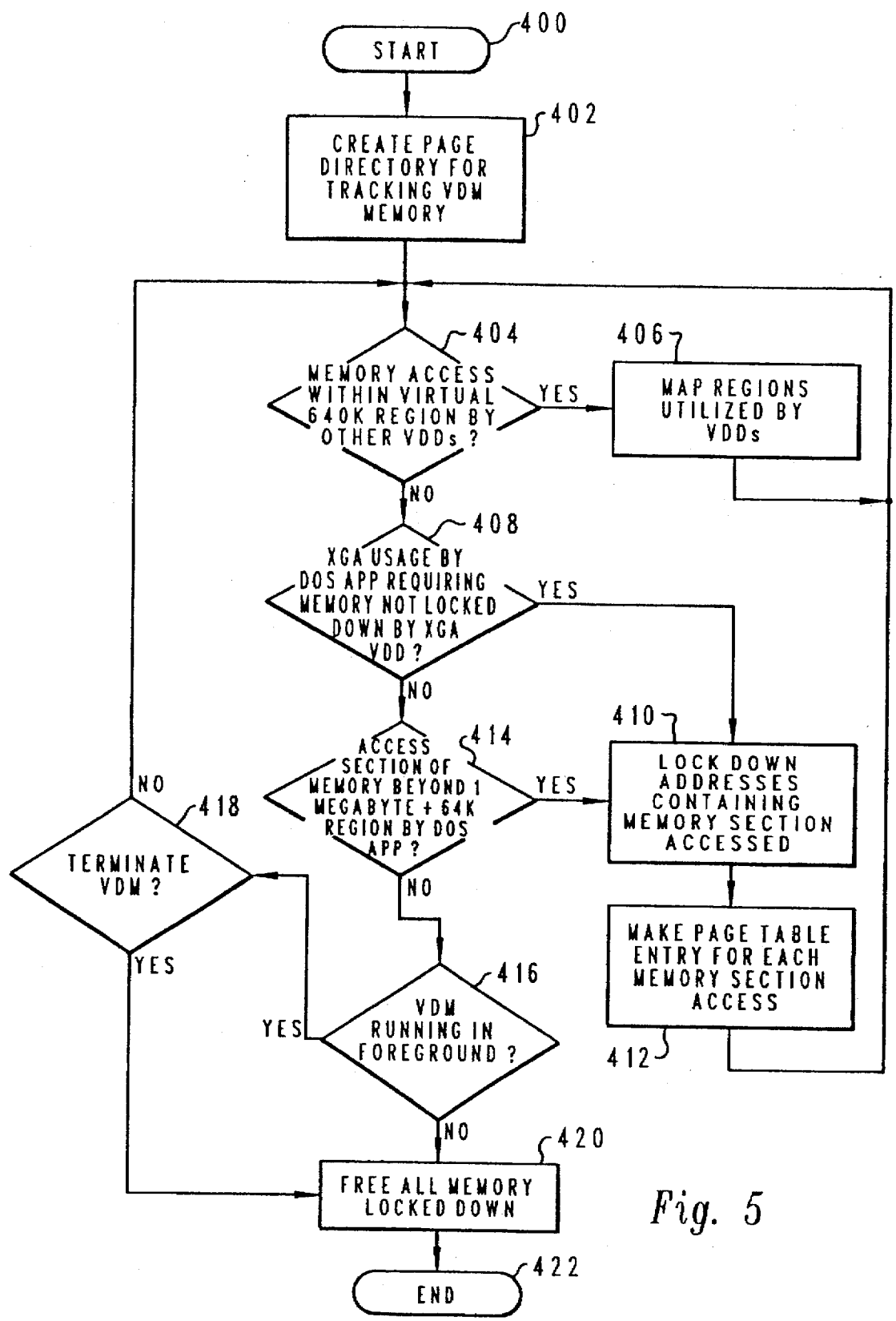
FIG. 5 depicts a high level flowchart of a method for providing access to an XGA adapter by a DOS application in accordance with a preferred embodiment of the present invention.

With reference to FIG. 5, there is depicted a high level flowchart of a method for providing access to an XGA adapter by a DOS application in accordance with a preferred embodiment of the present invention. As illustrated, the process begins in block 400 and thereafter proceeds to block 402, which illustrates the creation of a page directory for tracking VDM memory. This page directory is created when the VDM is initialized for the exclusive use of the paging mechanism in the microprocessor of the XGA adapter. Furthermore, it is preferable in a preferred embodiment of the present invention to lock down the page directory.

Next, the process proceeds to block 404, which depicts a determination of whether or not memory access has occured within the virtual 640K region by other virtual device drivers. If memory access has occurred within the virtual 640K region by other virtual device drivers, the process then proceeds to block 406, which illustrates the mapping of the regions utilized by the virtual device drivers. Thereafter, the process returns to block 404 to determine whether more memory has been accessed within the virtual 640K region by other virtual device drivers.

If no further access has occurred, the process then proceeds to block 408, which depicts a determination of whether or not XGA usage by the DOS application requires memory that is not locked down by the XGA virtual device driver. If memory exists that is not locked down by the XGA device driver, the process then proceeds to block 410, which illustrates the locking down of the addresses containing the memory section accessed. Thereafter, the process proceeds to block 412, which depicts the making of a page table entry for each memory section which has been accessed and locked down. Thereafter the process returns to block 404.

Referring back to block 408, if XGA usage by a DOS application requiring memory not locked down by the XGA virtual device driver does not exist, the process then proceeds to block 414, which illustrates a determination of whether or not access of a section of memory beyond the 1 megabyte+64K region by a DOS application has occurred. If access of a section of memory beyond the 1 megabyte plus 64K region by a DOS application has occurred, the process then returns to block 410, which illustrates the locking down of addresses containing the memory section accessed.

Thereafter, the process proceeds to block 412, which illustrates the making of a page table entry for each memory section accessed. Thereafter, the process returns to block 404 as described above. Referring back to block 414, if access of a section of memory beyond the 1 megabyte+64K region by a DOS application has not occurred, the proces to block 416, which depicts a determination of whether or not the VDM is running in the foreground. If the VDM is running in the foreground, the process then proceeds to block 418, which illustrates a determination of whether the VDM has terminated. If the VDM has not been terminated, the process then returns to block 404, as described above. Referring back to block 418, if the VDM has been terminated, the process proceeds to block 420, which depicts the freeing of all memory that has been locked down. Thereafter, the process terminates in block 422. Referring again to block 416, if the VDM is not running in the foreground, the process proceeds to block 420, which depicts freeing all memory that has been locked down. Afterwards, the process terminates as illustrated in block 422.

Figure 6:
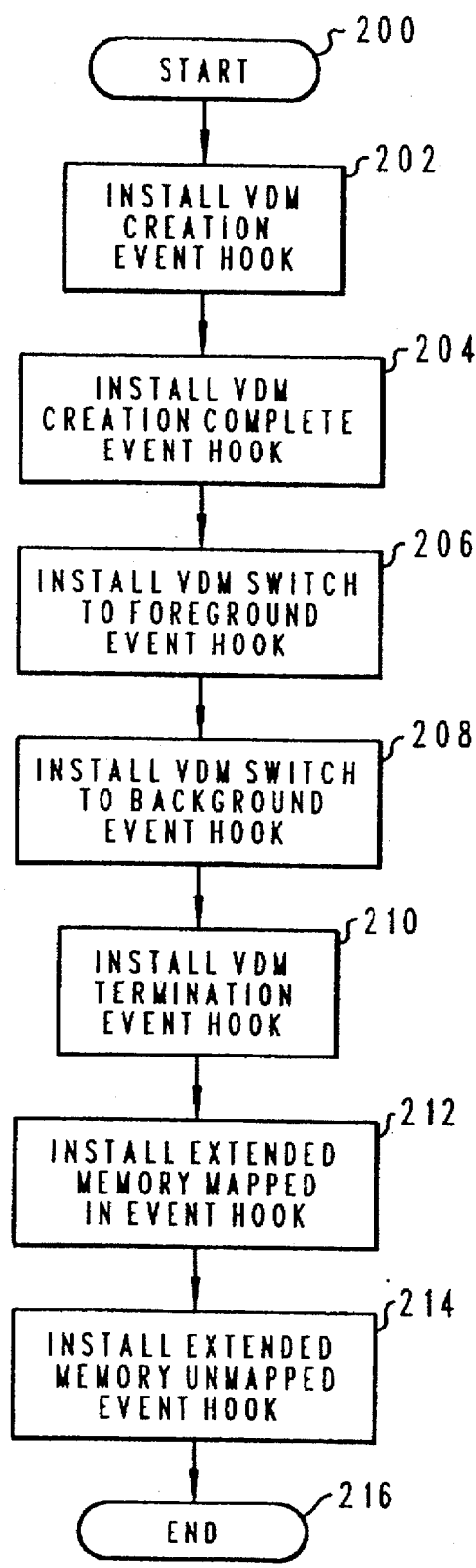
FIG. 6 is a high level flowchart of the initialization of an XGA virtual device driver in accordance with a preferred embodiment of the present invention.

Referring now to FIG. 6, there is depicted a high level flowchart of the initialization of an XGA virtual device driver in accordance with a preferred embodiment of the present invention. As illustrated the process begins in block 200 and thereafter proceeds to block 202, which illustrates the installation of a VDM creation event "hook". As those skilled in the art will appreciate a "hook" is a uniquely identified code sequence which may be inserted into a routine or application and utilized to generate a notice that a specific event has occured. Thereafter, the process proceeds to block 204, which depicts the installation of a VDM creation complete event hook will be utilized to generate a notification that the VDM created has been completed. In a similar manner, the process then proceeds to block 206, which illustrates the installation of a VDM switch to foreground event hook. Block 208 depicts the installation of a VDM switch to background event hook. Thereafter, the process continues to block 210, which illustrates the installation of a VDM termination event hook. Then, the process proceeds to block 212, which depicts the installation of a extended memory mapped in event hook. Thereafter, the process proceeds to block 214, which illustrates the installation of an extended memory unmapped event hook with the process terminating in block 216. In this manner the various events described may automatically generate notification as a result of the encounters of a "hook" in a manner well known in the art.

Figure 7:
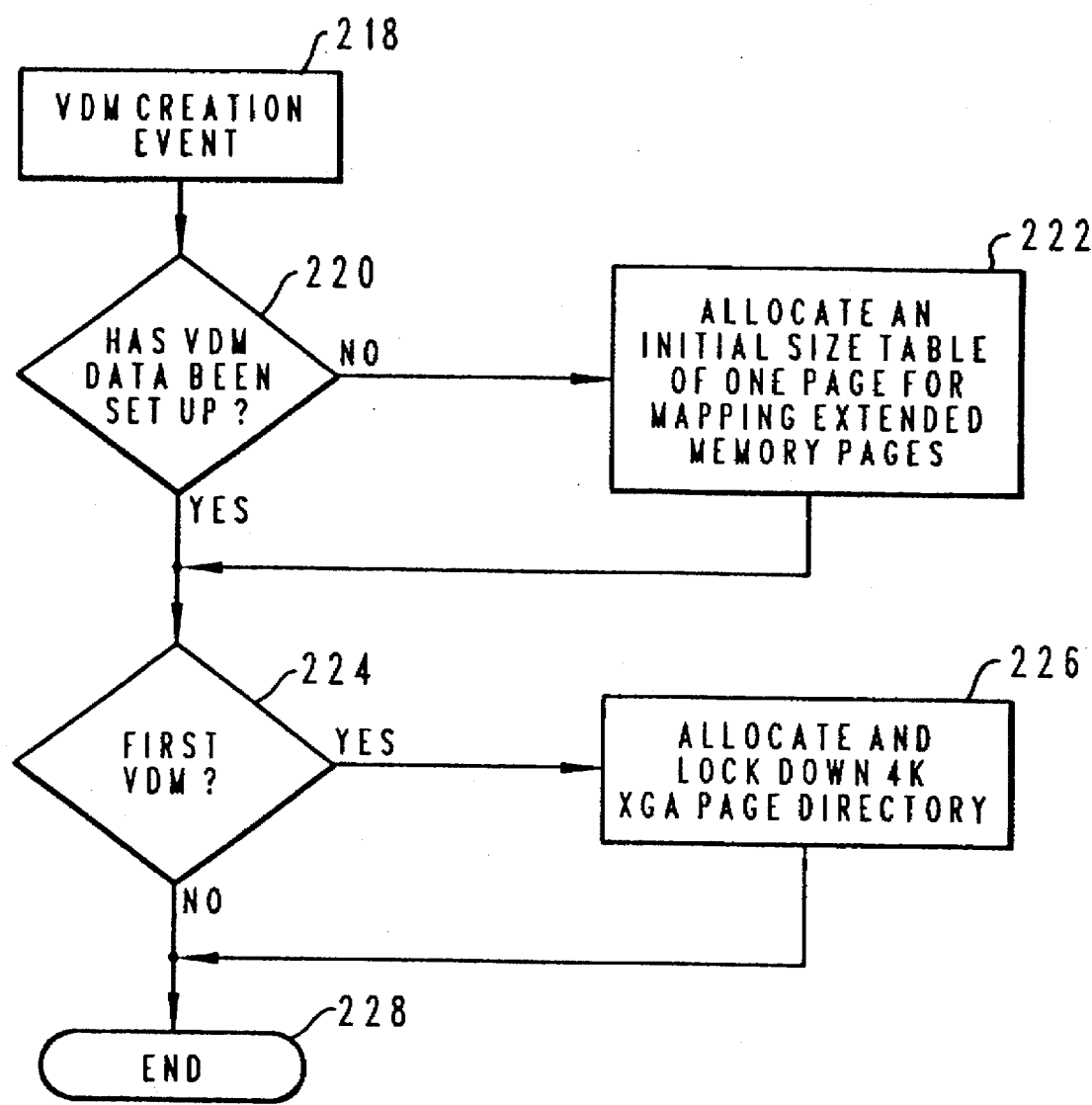
FIG. 7 is a high level flowchart illustrating creation notification in a XGA VDD virtual DOS machine in accordance with a preferred embodiment of the present invention.

With reference to FIG. 7, there is depicted a high level flowchart illustrating creation notification in a XGA VDD virtual DOS machine, in accordance with a preferred embodiment of the present invention. This process is triggered by a detection of VDM creation event hook, as described above. The process begins as illustrated in block 218 and thereafter proceeds to block 220, which depicts a determination of whether or not VDM data has been set up. If VDM data has not been set up, the process proceeds to block 222, which illustrates the allocation of an initial size table of one page for mapping extended memory pages. Thereafter, the process then proceeds to block 224, which depicts a determination of whether this VDM is the first VDM created. If the VDM is the first VDM created, the process then continues to block 226, which illustrates the allocation and the locking down of a 4K XGA page directory. Thereafter, the process terminates, as illustrated in block 228. Referring back to block 220, if the VDM data has been set up, the process proceeds directly to block 224. If this is not the first VDM, the process then terminates, as illustrated in block 228.

Figure 8:
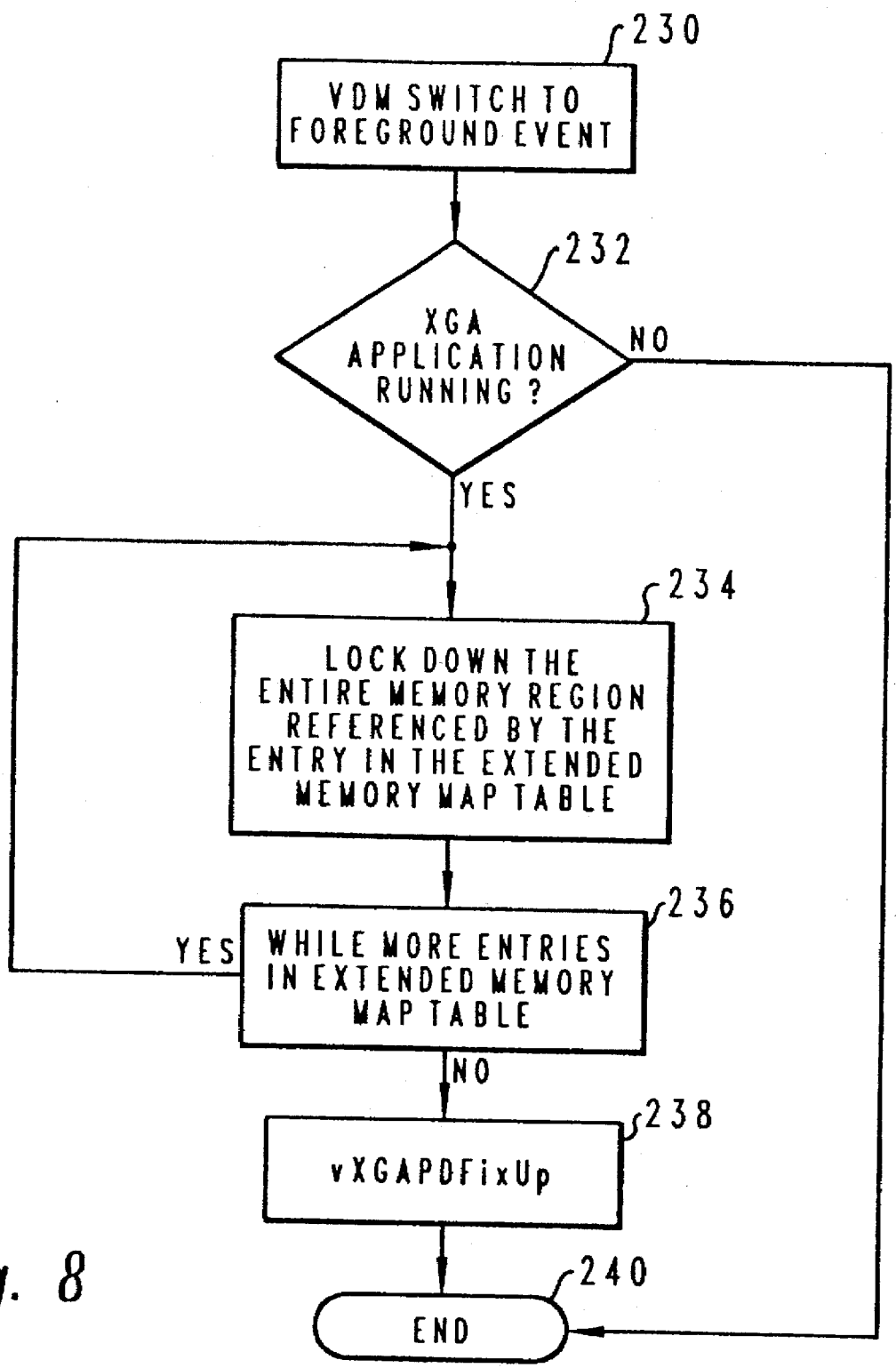
FIG. 8 is a high level flowchart illustrating the managing of memory when an XGA VDD virtual DOS machine is switched to the foreground, in accordance with a preferred embodiment of the present invention.

Referring now to FIG. 8, there is depicted a flowchart illustrating the managing of memory when an XGA VDD virtual DOS machine is switched to the foreground in accordance with a preferred embodiment of the present invention. The process begins in block 230, triggered by a detection VDM switching to the foreground hook. Thereafter, the process proceeds to block 232, which illustrates a determination of whether or not the XGA application is currently running. If the XGA application is currently running, the process then proceeds to block 234, which depicts the locking down of the entire memory region referenced by an entry in the extended memory map table. Thereafter, the process continues to block 236, which illustrates a determination of whether or not more entries in the extended memory map table exist. If more entries exist in the extended memory map table the process returns to block 234 to lock down the entire memory region referenced by the next entry in the extended memory map table. Referring again to block 236, if no more entries exist in the extended memory map table, the process then proceeds to block 238, which depicts the updating of the page directory. Thereafter the process terminates as illustrated in block 240. Referring again to block 232, if the XGA application is not running, the process also terminates as illustrated in block 240.

Figure 9:
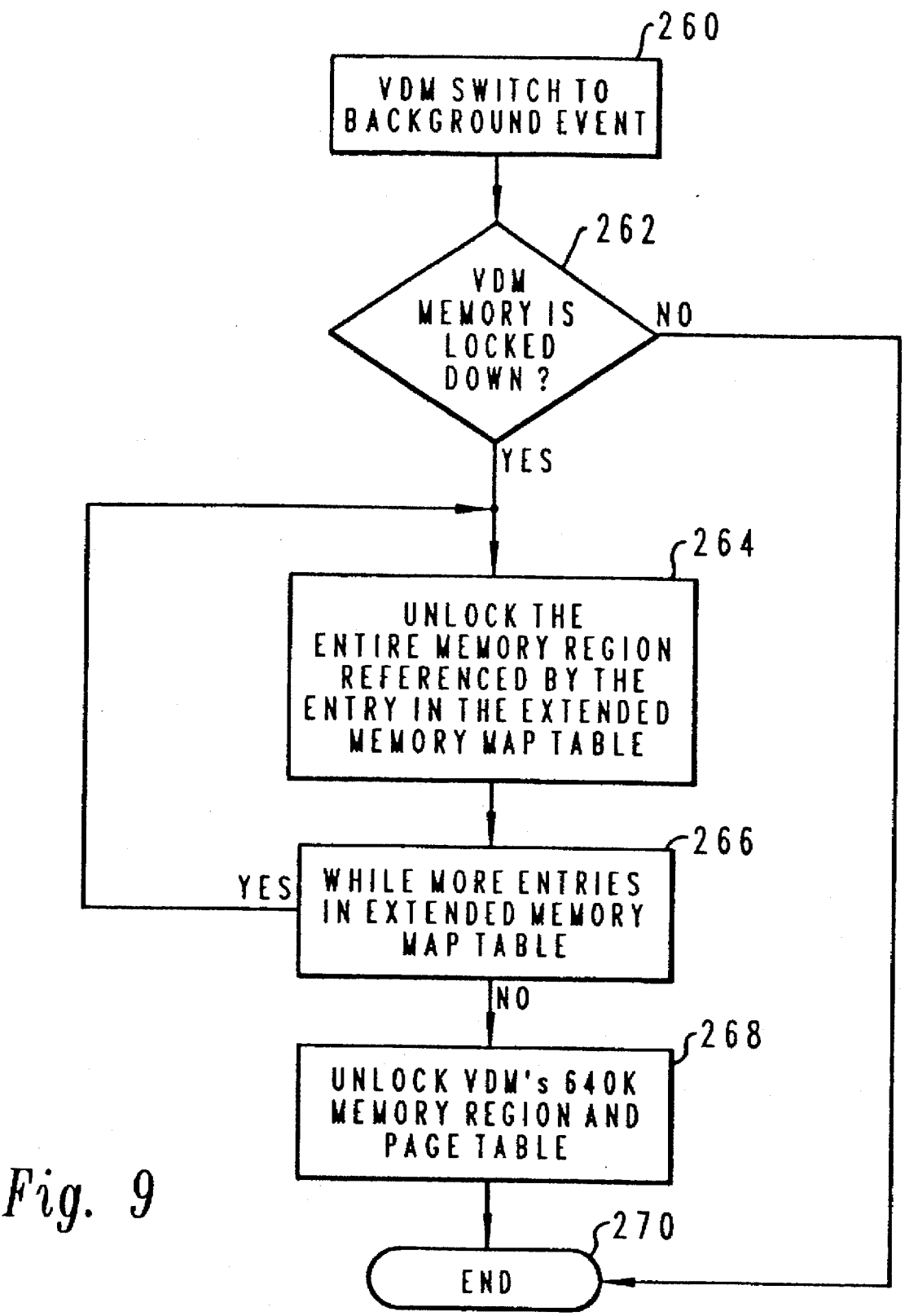
FIG. 9 is a high level flowchart illustrating the managing of memory during an XGA VDD virtual DOS machine switch to background in accordance with a preferred embodiment of the present invention.

Referring now to FIG. 9, there is depicted a high level flowchart which illustrates a method for managing memory during an XGA VDD virtual DOS machine switch to background in accordance with a preferred embodiment of the present invention. As illustrated, the process begins in block 260, which is initiated by a detection of a VDM switch to background hook. Thereafter, the process continues to block 262, which depicts a determination of whether or not VDM memory is locked down. If the VDM memory is locked down, the process proceeds to block 264, which illustrates the unlocking of the entire memory region referenced by an entry in the extended memory map table. Thereafter the process proceeds to block 266, which depicts a determination of whether or not more entries exist in the extended memory map table.

If more entries exist in the extended memory map table, the process returns to block 264 to unlock the entire memory region referenced by the next entry in the extended memory map table. Referring again to block 266, if no more entries exist in the extended memory map table, the process then proceeds to block 268, which illustrates the unlocking of the VDM's 640K memory region and page table. The process thereafter terminates as illustrated in block 270. Referring again to block 262, if the VDM memory is not locked down, the process also terminates as illustrated in block 270.

Figure 10:
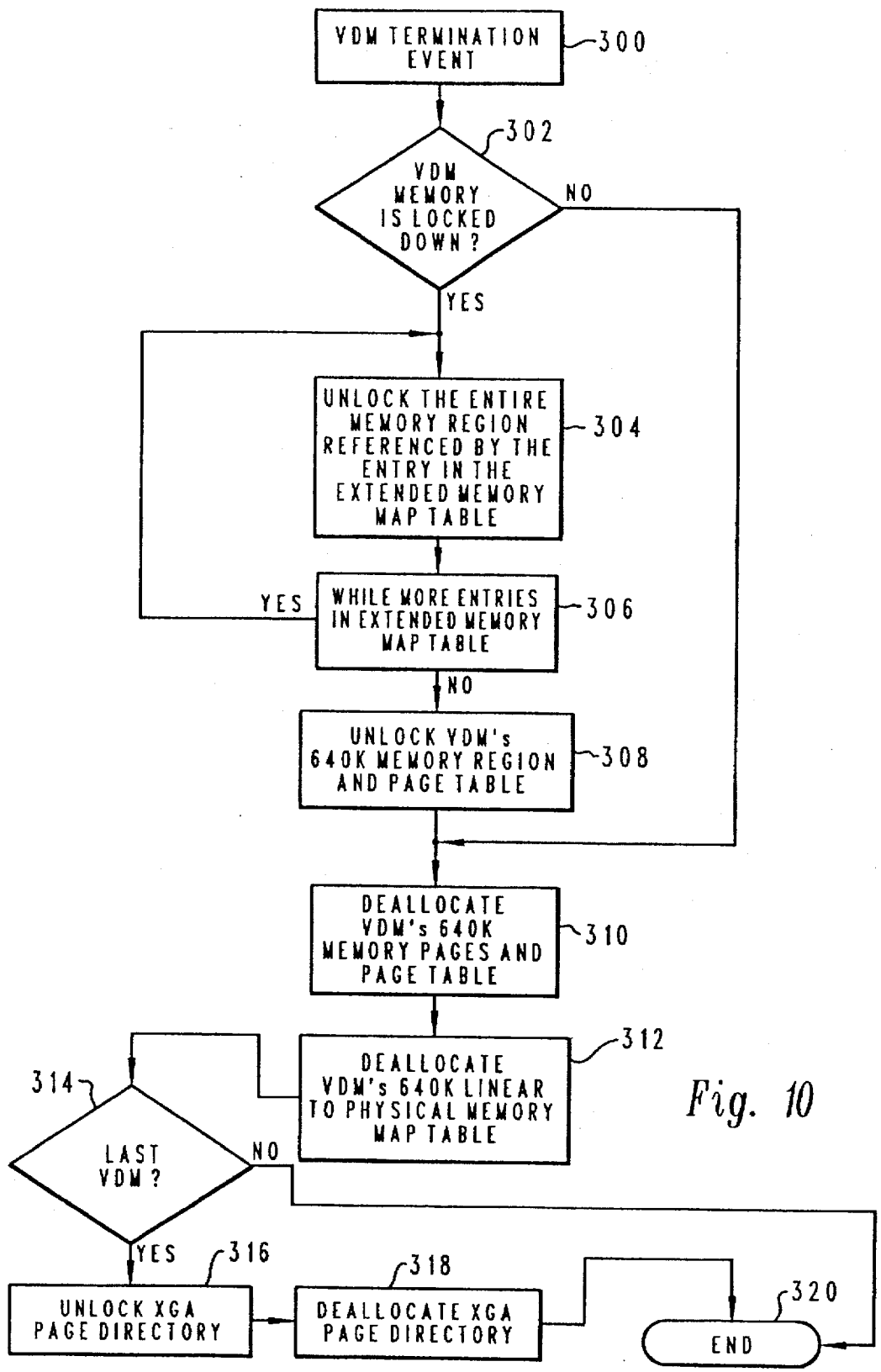
FIG. 10 is a high level flowchart illustrating the managing of memory in a virtual DOS machine in response to notification of VDM termination in accordance with a preferred embodiment of the present invention.

With reference to FIG. 10, there is depicted a high level flowchart illustrating a method for managing memory in a virtual DOS machine in response to notification of VDM termination in accordance with a preferred embodiment of the present invention. As illustrated, the process begins at block 300 and thereafter proceeds to block 302, which illustrates a determination of whether VDM memory is locked down.

If VDM memory is locked down, the process then proceeds to block 304, which depicts the unlocking of the entire memory region referenced by the entry in the extended memory map table. Thereafter, the process continues to block 306, which depicts a determination of whether or not more entries in the extended memory map table exist. If more entries exist in the extended memory map table, the process returns to block 304 to unlock the entire memory regions referenced by the next entry in the extended memory map table.

Referring again to block 306, if more entries in the extended memory map table do not exist, the process then proceeds to block 308, which depicts the unlocking of the VDM's 640K memory region and page table. Thereafter, the process proceeds to block 310, which depicts the deallocation of the VDM's 640K memory pages and page table. Referring again to block 302, if the VDM memory is not locked down, the process proceeds directly to block 310 and the VDM's 640K memory pages and memory page table are deallocated. Thereafter, the process continues to block 312, which illustrates the deallocation of the VDM's 640K linear to physical map table.

Next, the process proceeds to block 314, which depicts a determination of whether or not the VDM is the last VDM being terminated. If it is determined that the VDM being terminated is the last VDM, the process then proceeds to block 316, which illustrates the unlocking of the XGA page directory. The process then proceeds to block 318, which depicts the deallocation of the XGA page directory. Thereafter, the process terminates as illustrated in block 320. Referring again to block 314, if the VDM being terminated is not the last VDM, the process then terminates, as illustrated, in block 320.

Figure 11:
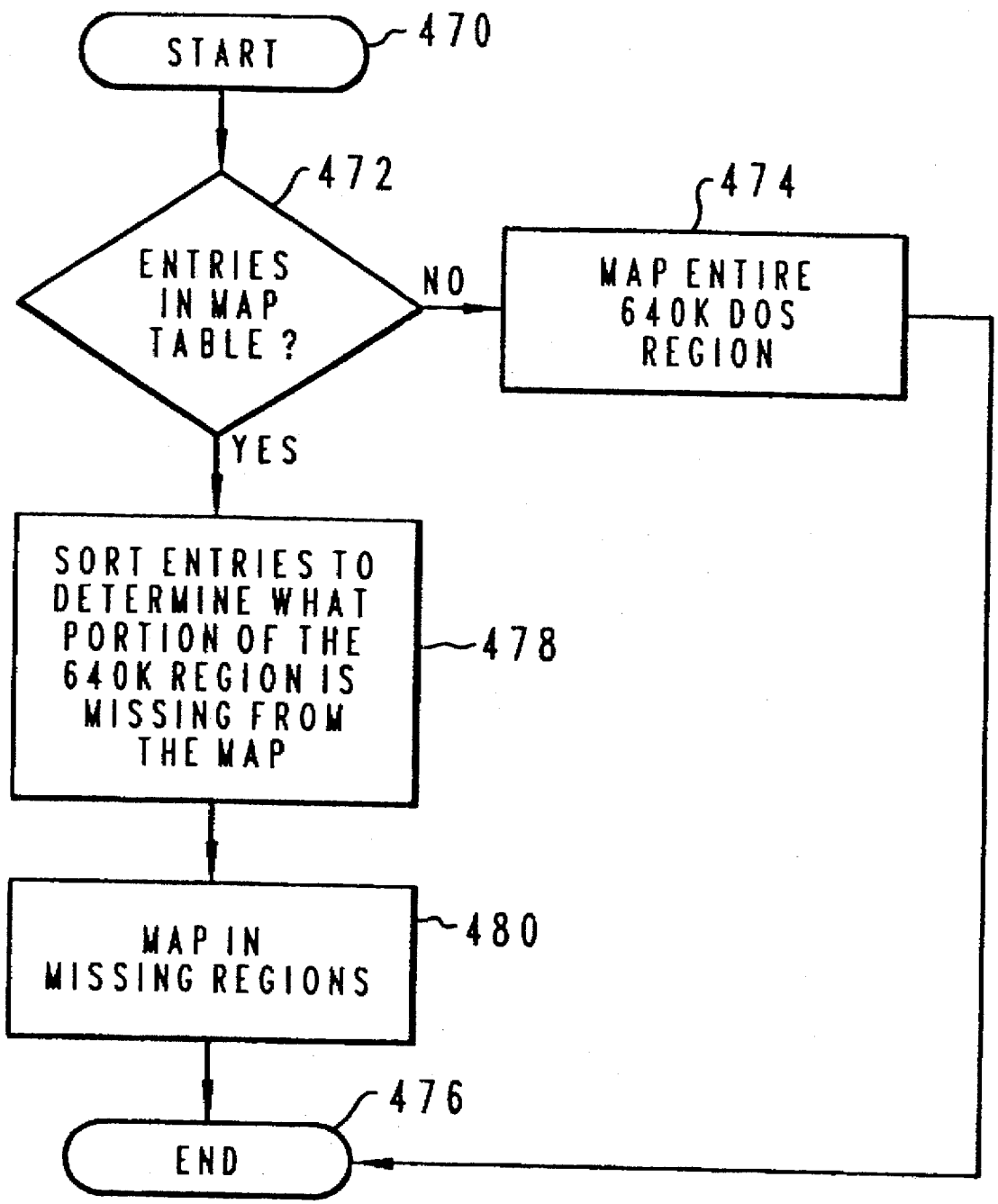
FIG. 11 is a high level flowchart illustrating map memory usage in the first 640K memory in a VDM after the VDM has been created, in accordance with a preferred embodiment of the present invention.

Referring to FIG. 11, there is depicted a high level flowchart which illustrates a method utilized to map memory usage in the first 640K memory in a VDM after the VDM has been created, in accordance with a preferred embodiment of the present invention. The process begins as illustrated in block 470 and thereafter proceeds to block 472, which depicts a determination of whether or not map entries exist in the table. If map entries do not exist in the table, the process then proceeds to block 474, which illustrates the mapping of the entire 640K DOS region. Thereafter the process terminates as illustrated in block 476.

Referring again to block 472, if entries exist in the map table, the process then proceeds to block 478, which depicts the sorting of entries in ascending order, to determine what portion of the 640K region is missing from the map table. Thereafter, the process proceeds to block 480, which depicts mapping in the regions missing from the map table.

Figure 12:
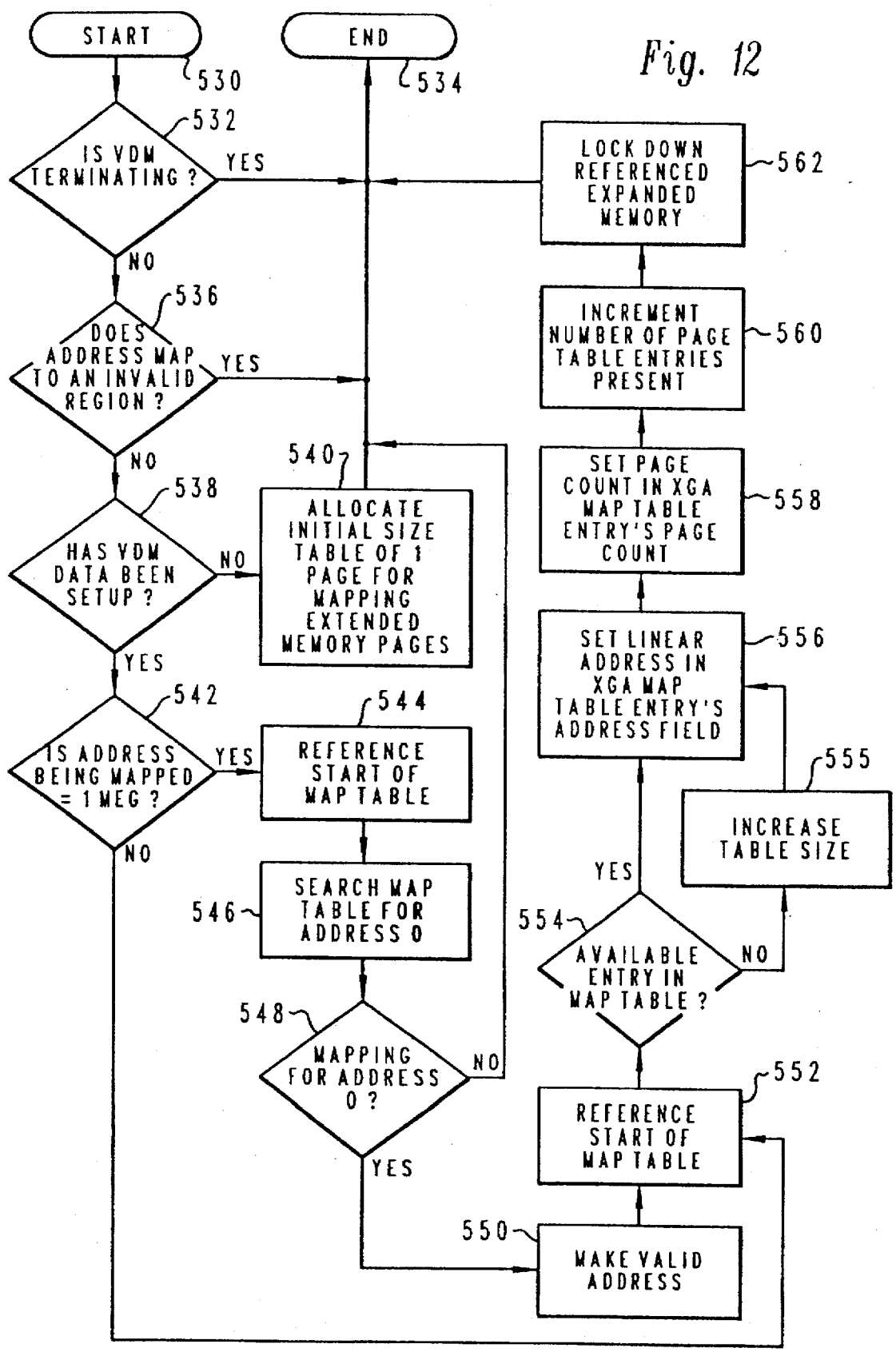
FIG. 12 is a high level flowchart illustrating a method for handling the mapping of pages in a memory system in accordance with a preferred embodiment of the present invention.

With reference now to FIG. 12, there is depicted a high level flowchart which illustrates a method for handling the mapping of pages, in accordance with a preferred embodiment of the present invention. The process begins at block 530, and thereafter proceeds to block 532, which depicts a determination of whether or not the VDM is terminating in response to a detection of an associated hook. If the VDM is terminating, the process terminates as illustrated in block 534.

Referring again to block 532, if the VDM is not terminating, the process then proceeds to block 536 which illustrates a determination of whether or not the address maps to, or references an invalid region. If the address does reference an invalid region, the process then terminates as illustrated in block 534. Otherwise, the process proceeds to block 538, which depicts a determination of whether or not the VDM data has been set up. If the VDM data has not been set up, the process proceeds to block 540, which depicts the allocation of an initial size table of one page for mapping extended memory pages, and thereafter the process terminates as illustrated in block 534.

Referring again to block 538, if the VDM data has been set up, the process then proceeds to block 542, which depicts a determination of whether or not the address being mapped is equal to "1 meg". If the address is equal to "1 meg", the process then proceeds to block 544, which illustrates a reference to the start of the map table. Thereafter, the process proceeds to block 546, which depicts searching the map table for address zero.

Thereafter, the process proceeds to block 548, which illustrates a determination of whether or not the mapping is for address zero. If the mapping is not for address zero, the process then terminates as illustrated in block 534. Referring again to block 548, if the mapping is for address zero, the process then proceeds to block 550, which depicts making the address valid.

Next, the process proceeds to block 552, which illustrates a reference to the start of the map table. Thereafter, the process proceeds to block 554, which depicts a determination of whether or not an available entry in the map table exists. If an available entry does not exist in the map table, the process proceeds to block 555, which depicts the increasing of the table size to make more entries available.

At this point, the process continues to block 556, which illustrates the setting of the linear address in the XGA map table entry's address field. Referring again to block 554, if an available entry does exist, the process then proceeds to block 556 and the linear address is set in the XGA map table entry's address field. Afterwards, the process proceeds to block 558, which depicts setting the page count in the XGA map table entry's page count. Next, the process proceeds to block 560, which illustrates the incrementing of the number of page table entries present and, thereafter, the process continues to block 562, which depicts the locking down of the referenced expanded memory with the process thereafter terminating in block 534. Referring again to block 548, if the address being addressed is not equal to "1 meg", the process continues to block 554 and continues as previously described.

Figure 13:
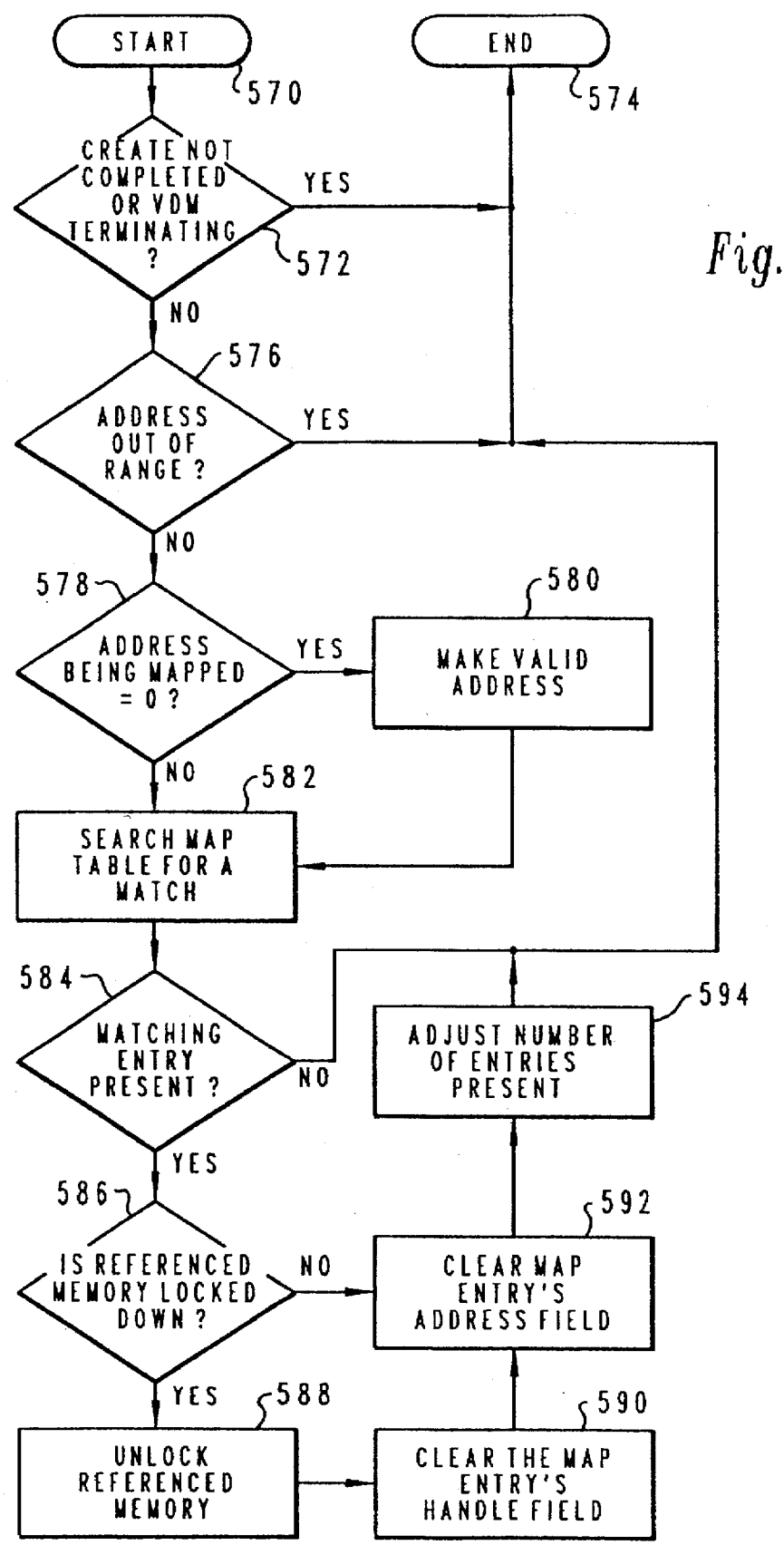
FIG. 13 is a high level flowchart illustrating unmapping pages relevant to the VDM in a preferred embodiment of the present invention.

Now referring to FIG. 13, there is depicted a high level flowchart illustrating a method for unmapping pages relevant to the VDM in accordance with a preferred embodiment of the present invention. As illustrated, the process begins in block 570 and thereafter proceeds to block 572, which depicts a determination of whether or not VDM data has not been initialized or the VDM is terminating. If either of those conditions is true, the process terminates as illustrated in block 574.

Referring again to block 572, if the VDM data has been initialized or the VDM is not terminating, the process then proceeds to block 576, which illustrates a determination of whether or not the address is out of the permitted range. If the address is out of the permitted range, the process again terminates as illustrated in block 574. If the address is not out of range the process then continues to block 578, which depicts a determination of whether or not the address being mapped is equal to zero. If the address being mapped is equal to zero, the process then continues to block 580, which illustrates making the address valid. Thereafter, the process proceeds to block 582, which depicts the searching of the map table for a match.

Referring again to block 578, if the address being mapped is not equal to zero the process proceeds to block 582, which depicts the searching of the map table for a match. Afterwards, the process proceeds to block 584, which illustrates a determination of whether or not a matching entry is present. If a matching entry is not present, the process again terminates in block 574. If, however, a matching entry is present the process continues to block 586, which depicts a determination of whether or not the referenced memory is locked down. If the referenced memory is locked down, the process then proceeds to block 588, which illustrates the unlocking of the referenced memory.

Thereafter, the process proceeds to block 590, which depicts the clearing of the map entry's handle field. After clearing the map entry's handle field, the process proceeds to block 592, which illustrates the clearing of the map entry's address field. Thereafter, the process continues to block 594, which depicts an adjustment of the number of entries present with the process thereafter terminating in block 574. Referring back to block 586, if the referenced memory is not locked down, the process then proceeds instead to block 592, which illustrates the clearing of the map entry's address field. Thereafter, the process proceeds to block 594, which depicts an adjustment of the number of entries present with the process thereafter terminating in block 574.

Figure 14:
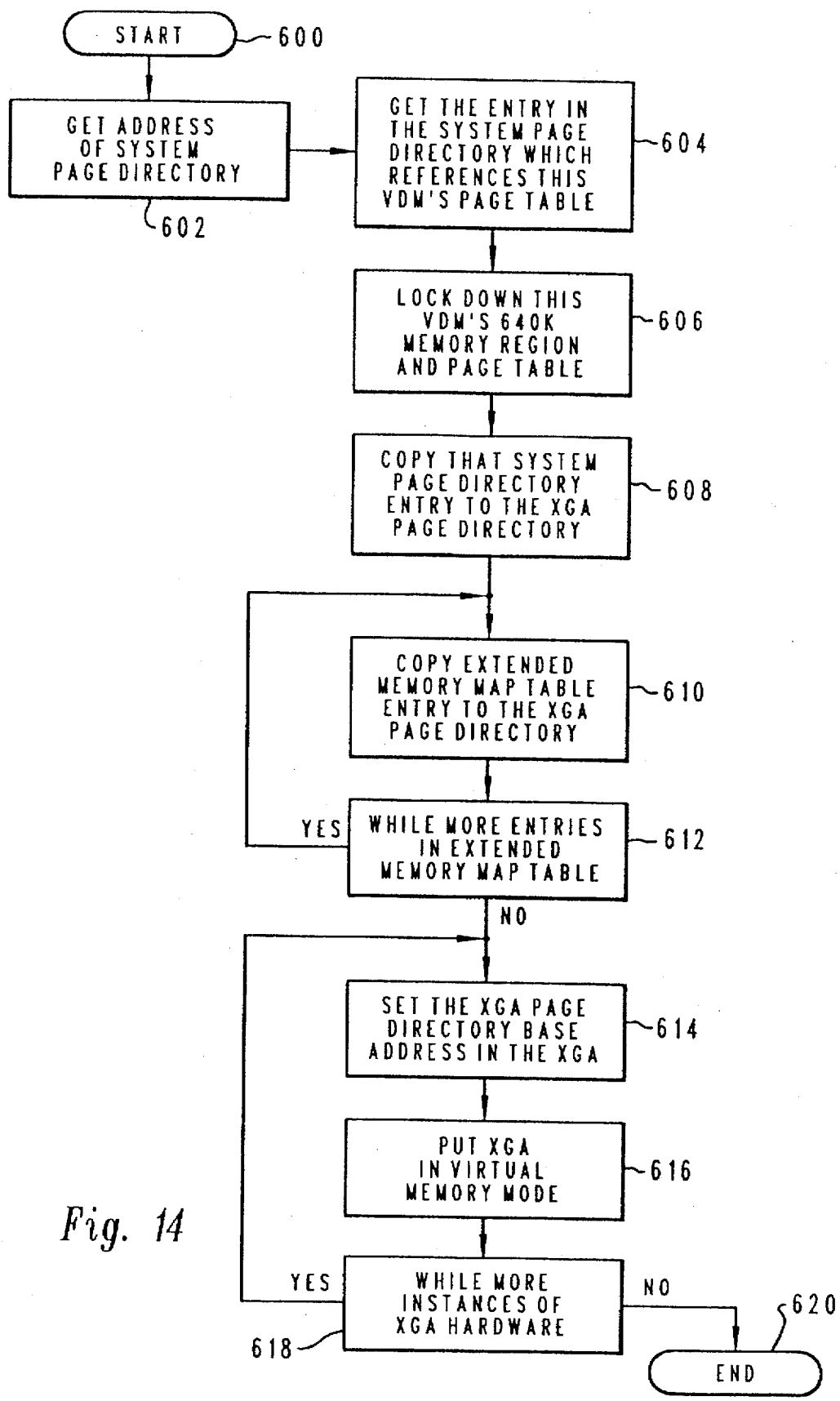
FIG. 14 is a high level flowchart illustrating the updating of an XGA VDD XGA page directory in accordance with a preferred embodiment of the present invention.

With reference now to FIG. 14, there is depicted a flowchart which illustrates a method for updating an XGA VDD XGA page directory in accordance with a preferred embodiment of the present invention. As illustrated, the process begins in block 600, and thereafter continues to block 602 which depicts the step of obtaining the address of the system page directory. Thereafter, the process continues to block 604, which illustrates the step of obtaining the entry in the system page directory which references this particular VDM's page table.

Next, the process proceeds to block 606, which depicts the locking down of this particular VDM's 640K memory region and page table. Thereafter, the process proceeds to block 608, which illustrates the copying of the system page directory entry into the XGA page directory. After updating the XGA page directory, the process proceeds to block 610, which depicts the copying of the extended memory map table entry to the XGA page directory. Thereafter, the process proceeds to block 612, which illustrates a determination of whether or not more entries exist in the extended memory map table.

If more entries exist in the extended memory map table, the process returns to block 608 to copy another extended memory map table entry to the XGA page directory. When no more entries exist in the extended memory map table, the process proceeds to block 614, which depicts the setting of the XGA page directory base address in the XGA adapter. Thereafter, the process continues to block 616, which illustrates the placement of the XGA adapter into virtual memory mode. Next, the process proceeds to block 618, which depicts a determination of whether or not more instances of XGA hardware exist. If more XGA hardware exists, the process returns to block 614 to set the XGA page directory base address in the particular XGA adapter, and then, the process proceeds to block 616 to place the XGA in a virtual memory mode. Referring back to block 618, if more instances of the XGA hardware do not exist the process then terminates as illustrated in block 620.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for providing exchange of data between a peripheral device having a paging mechanism and an application operating in a virtual machine, wherein said virtual machine is running on said data processing system and contains a block of memory having a plurality of sections of memory, comprising:

providing a page directory for exclusive use by said paging mechanism of said peripheral device in response to said application requiring usage of said peripheral device;

selectively locking down a section of said block of memory within said data processing system in response to a usage of said section of memory by said application;

updating said page directory with an entry corresponding to said section of said block of memory locked down to allow said peripheral device access to said section of said block of memory, wherein data within said section of said block of memory is unswappable; and selectively updating therafter said page directory by mapping an entry into said page directory in response to said usage of said section of said memory in order to track memory usage within said block of memory utilized by said virtual machine.

2. The method of claim 1 further comprising the step of creating and locking down said page directory in response to creation of said virtual machine for exclusive use by said paging mechanism of said peripheral device.

3. The method of claim 2 further comprising the step of freeing said section of memory locked down in response to termination of said virtual machine.

4. The method of claim 3 further comprising the step of freeing said section of memory locked down in response to a switch of said virtual machine into background.

5. The method of claim 4 further comprising the step of freeing said section of memory locked down in response to said application no longer requiting access to said peripheral device.

6. The method of claim 5, wherein said page directory contains a page table and a page frame and wherein said step of updating said page directory comprising the step of mapping entries representing memory locations in a linear address form.

7. The method of claim 6, further comprising the step of updating said page directory to reflect accesses made to said block of memory while said virtual machine has been switched into background.

8. A data processing system for providing exchange of data between a peripheral device having a paging mechanism and application operating in a virtual machine, wherein said virtual machine is running on said data processing system and contains a block of memory having a plurality of sections of memory, said apparatus comprising:

means for providing a page directory for exclusive use by said paging mechanism of said peripheral device in response to said application requiring usage of said peripheral device;

means for selectively locking down a section of said block of memory within said data processing system in response to a usage of said section of memory by said application; and means for updating said page directory with an entry corresponding to said section of said block of memory locked down to allow said peripheral device access to said section of said block of memory, wherein data within said section of said block of memory is unswappable; and means for selectively updating thereafter said page directory by mapping an entry into said page directory in response to said usage of said section of said memory in order to track memory usage within said block of memory utilized by said virtual machine.

9. The data processing system according to claim 8 further comprising means for creating and locking down said page directory in response to creation of said virtual machine for exclusive use by said paging mechanism of said peripheral device.

10. The data processing system according to claim 9 further comprising means means for freeing said section of memory locked down in response to termination of said virtual machine.

11. The data processing system according to claim 10 further comprising means for freeing said section of memory locked down in response to a switch of said virtual machine into background.

12. The data processing system according to claim 11 further comprising means for freeing said section of memory locked down in response to said application no longer requiring access to said peripheral device.

13. The data processing system according to claim 12, wherein said page directory includes a page table and a page frame and wherein said means for selectively updating said page directory comprising means for mapping entries representing memory locations in a linear address form.

14. The data processing system according to claim 13, further comprising means for updating said page directory to reflect accesses made to said block of memory while said virtual machine has been switched into background.

15. A data processing system for providing exchange of data between a peripheral device and an application, said data processing system comprising:

a system memory;

a peripheral device, wherein said peripheral device access data in said system memory utilizing fixed locations within said system memory;

a page directory, wherein said page directory is for use by said peripheral device;

a virtual machine located within said system memory, wherein said virtual machine utilizes a portion of said system memory;

an application executing within said virtual machine, wherein said application utilizes a part of said portion of said system memory;

locking means, responsive to use of said peripheral device by said application, for locking down said part of said portion of said system memory utilized by said application, wherein said part of said portion of system memory that is locked down is unswappable; and updating means for updating said page directory with an entry corresponding to said part of said portion of system memory that is locked down by said locking means, wherein said peripheral device utilizes said page directory to access said part of said portion of system memory that is locked down.

16. The data processing system of claim 15 wherein all of said part of said portion of system memory that is locked down is contiguous.

17. The data processing system of claim 15 wherein all of said part of said portion of said system memory that is locked down is noncontiguous.

18. The data processing system of claim 17, wherein said page directory is for use only by said peripheral device.

* * * * *